United States Patent
Rorabaugh

(10) Patent No.: US 7,031,725 B2
(45) Date of Patent: Apr. 18, 2006

(54) METHOD AND SYSTEM FOR DETERMINING RELATIVE POSITIONS OF NETWORKED MOBILE COMMUNICATION DEVICES

(75) Inventor: C. Britton Rorabaugh, Aldan, PA (US)

(73) Assignee: DRS Communications Company, LLC, Wyndmoor, PA (US)

( * ) Notice: Subject to any disclaimer, the term of this patent is extended or adjusted under 35 U.S.C. 154(b) by 354 days.

(21) Appl. No.: 10/641,588

(22) Filed: Aug. 11, 2003

(65) Prior Publication Data

US 2004/0033808 A1 Feb. 19, 2004

Related U.S. Application Data

(60) Provisional application No. 60/402,964, filed on Aug. 13, 2002.

(51) Int. Cl.
*H04Q 7/20* (2006.01)
(52) U.S. Cl. .................... 455/456.1; 455/404.2; 455/427
(58) Field of Classification Search ............. 455/456.1, 455/456.2, 456.3, 404.2, 407, 427, 517, 67.11, 455/67.1; 342/147, 357.06, 357.07, 357.08, 342/357.09
See application file for complete search history.

(56) References Cited

U.S. PATENT DOCUMENTS

| | | | |
|---|---|---|---|
| 5,301,353 A | 4/1994 | Borras et al. | |
| 5,365,516 A * | 11/1994 | Jandrell | 370/335 |
| 5,552,772 A * | 9/1996 | Janky et al. | 340/573.4 |
| 5,578,989 A | 11/1996 | Pedtke | |
| 5,583,776 A | 12/1996 | Levi et al. | |
| 5,923,294 A | 7/1999 | Bacelon et al. | |
| 5,974,329 A | 10/1999 | Wylie et al. | |
| 6,094,164 A | 7/2000 | Murphy | |
| 6,154,139 A | 11/2000 | Heller | |
| 6,243,588 B1 * | 6/2001 | Koorapaty et al. | 455/456.2 |
| 6,272,316 B1 * | 8/2001 | Wiedeman et al. | 455/13.1 |
| 6,289,282 B1 | 9/2001 | Hassler et al. | |
| 6,445,344 B1 | 9/2002 | Wise et al. | |
| 6,453,168 B1 * | 9/2002 | McCrady et al. | 455/517 |
| 6,671,514 B1 * | 12/2003 | Cedervall et al. | 455/456.1 |
| 6,876,326 B1 * | 4/2005 | Martorana | 342/463 |
| 2003/0216142 A1 * | 11/2003 | Wigren | 455/456.1 |
| 2003/0232598 A1 * | 12/2003 | Aljadeff et al. | 455/41.2 |
| 2004/0203420 A1 * | 10/2004 | Rick et al. | 455/67.11 |
| 2004/0203844 A1 * | 10/2004 | Rajkotia | 455/456.1 |
| 2005/0136984 A1 * | 6/2005 | Nakatsuchi et al. | 455/566 |

* cited by examiner

*Primary Examiner*—CongVan Tran
(74) *Attorney, Agent, or Firm*—Norris, McLaughlin & Marcus

(57) ABSTRACT

Relative positions of a plurality of mobiles communication devices, which form a wirelessly networked group of mobiles, are determined at each of the mobiles of the group without the need for external positioning information obtained from a location remote from the actual locations of the mobiles of the group. The relative positions are determined at the mobiles of the group based on mobile-to-mobile range measurements, distance and direction of movement measurements and altitude measurements made at the respective mobiles.

37 Claims, 9 Drawing Sheets

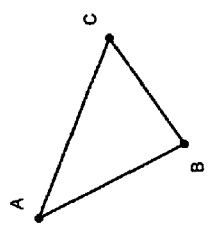
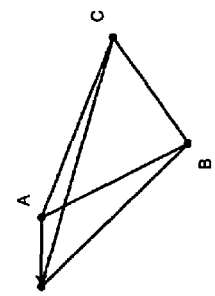
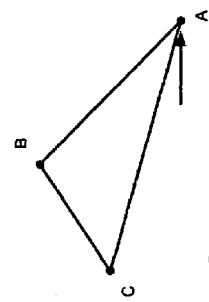
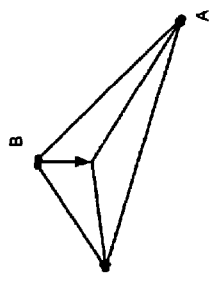
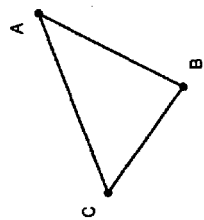
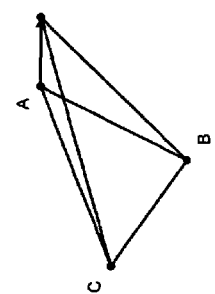
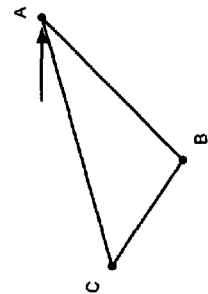
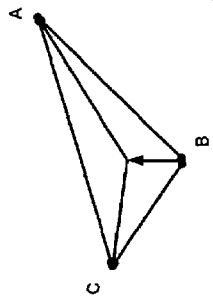
FIG. 10A    FIG. 10B    FIG. 10C    FIG. 10D

METHOD AND SYSTEM FOR DETERMINING RELATIVE POSITIONS OF NETWORKED MOBILE COMMUNICATION DEVICES

CROSS REFERENCE TO RELATED APPLICATION

This application claims the benefit of U.S. Provisional Application No. 60/402,964 filed Aug. 13, 2002, assigned to the assignee of this application and incorporated by reference herein.

FIELD OF THE INVENTION

The present invention relates generally to determining relative positions of objects and, more particularly, determining relative positions of a plurality of wirelessly networked mobile communications devices without using remotely generated positioning information.

BACKGROUND OF THE INVENTION

Groups of individuals, such as police officers, firefighters, rescue workers or soldiers, often need to conduct operations in built up urban areas. While operating in such areas, the individuals often find it difficult or impossible to maintain accurate and updated knowledge of one another's locations because the structures in an urban area block visual contact between the individuals. As a result of the inability to establish visual contact, soldiers in urban environments often become casualties of friendly fire. Similarly, police officers, firefighters and soldiers are not able to assist fallen comrades who may be nearby, yet cannot be visually observed.

Current electronic position location systems do not provide a satisfactory solution to the problem of providing an individual, who is part of a group of individuals, with current information as to the positions of other individuals in the group when the individuals of the group are located in an urban environment where visual contact among and between individuals of the group is difficult or not possible. For example, a global positioning satellite ("GPS") navigational system typically performs poorly inside of a building or in an urban canyon. Similarly, a position determination system for locating cellular phones, such as developed in accordance with the FCC's E911 initiative, is usually inadequate because the positioning information generated is of insufficient accuracy, is limited to a description of location only in two dimensions and depends upon a sophisticated, fixed infrastructure that is not always available in the areas in which many groups will need to conduct operations.

Therefore, a need exists for a system and method for automatically determining the relative positions of individuals who are members of a group without the use of positioning information obtained from an external source that is not part of the group and located remotely from the area in which the group is positioned.

SUMMARY OF THE INVENTION

In accordance with the present invention, each of a plurality of mobile communications devices, which can communicate information wirelessly with one another and form a networked group, determines its position relative to the other mobiles in the group based on each of the mobiles' computing its range with respect to each of the other mobiles or receiving the range information from and computed at another mobile of the group, monitoring distance and direction of its movement, monitoring its altitude and obtaining information from the other mobiles as to their respective altitudes and movement. Thus, based solely on the range, movement and altitude information, in other words, without the use of external positioning information such as global positioning system ("GPS") satellite information obtained from a location remote from the positions of the mobiles of the group, each of the mobiles determines its relative distance and bearing with respect to each of the other mobiles in the group.

In a preferred embodiment, each mobile of a wireless networked group of mobile includes a position processing module processor coupled to wireless data and ranging transceiver modules. The ranging transceiver module communicates wirelessly with the ranging transceiver module of each of the other networked mobiles to obtain information for computing the range between its mobile and each of the other mobiles in the group. A position processing module in each of the mobiles uses the ranges to construct a virtual constellation of the actual positions of the networked mobiles and a virtual constellation of a reflection of the actual positions virtual constellation. A movement assessment module in each of the mobiles monitors distance and direction of movement of the mobile. The movement assessment module also measures altitude of the subject mobile with respect to a common calibration point, in view of altitude data received from the other networked mobiles at the data transceiver module. The position processing module uses the movement (distance and direction) data collected at its mobile and received at the data transceiver module from the other mobiles to resolve any potential reflective ambiguity concerning the two possible constellations, thereby identifying the true constellation shape. In a preferred embodiment, the position processing module uses the altitude data to orient the true constellation with respect to the true horizontal plane. In a further preferred embodiment, the position processing module uses the distance and direction data to orient the true constellation with respect to azimuth. The resulting oriented true constellation represents the relative positions, i.e., the oriented geometric shape, of all of the mobiles within the networked group.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which:

FIGS. 10A–10D are illustrations of the true image and mirror image virtual constellations of FIG. 2, respectively, oriented based on movement data processing in accordance with the present invention.

DETAILED DESCRIPTION OF THE INVENTION

Figure 1:
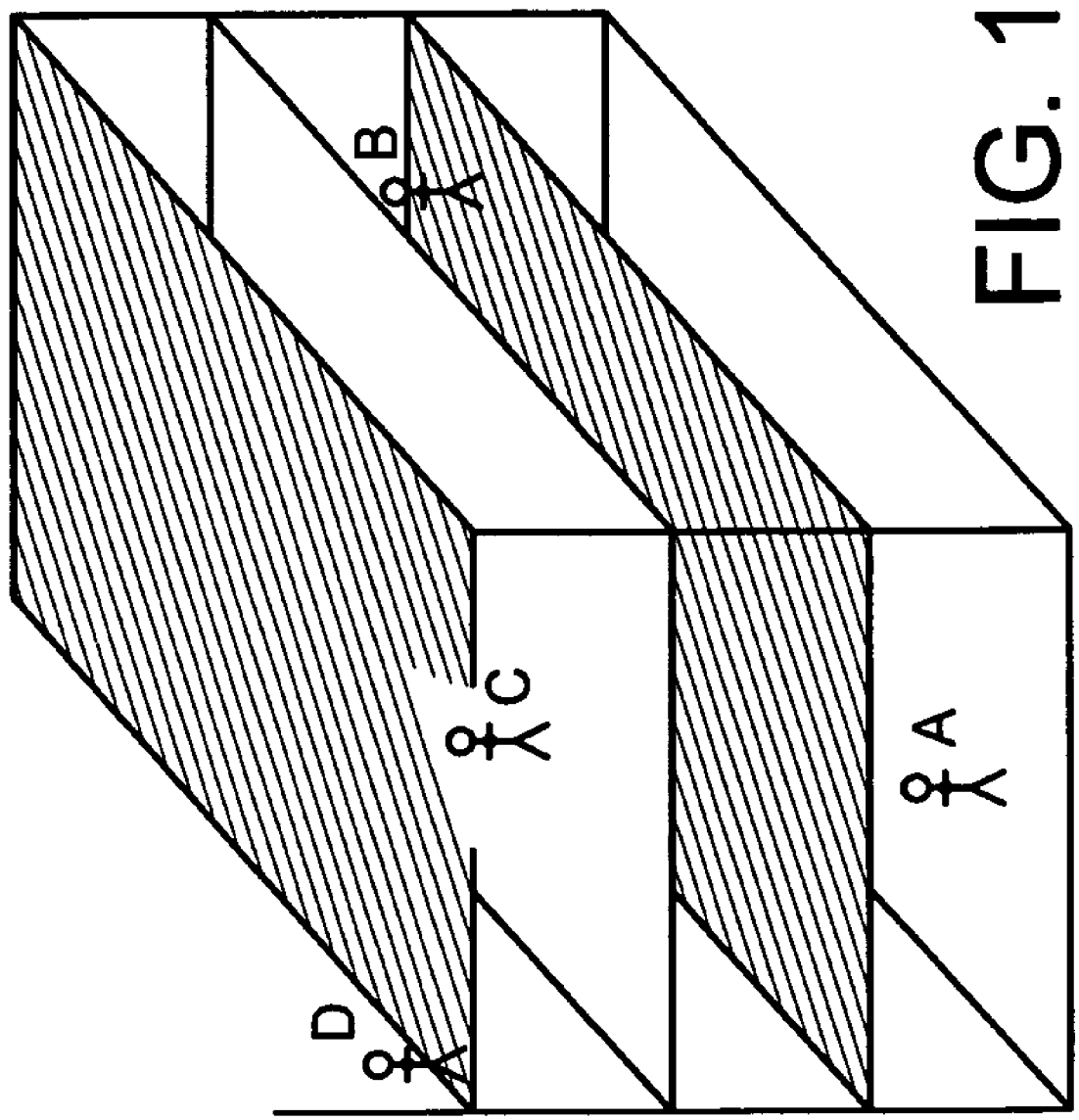
FIG. 1 is a perspective view of a group of individuals dispersed in a building.
Figure 2:
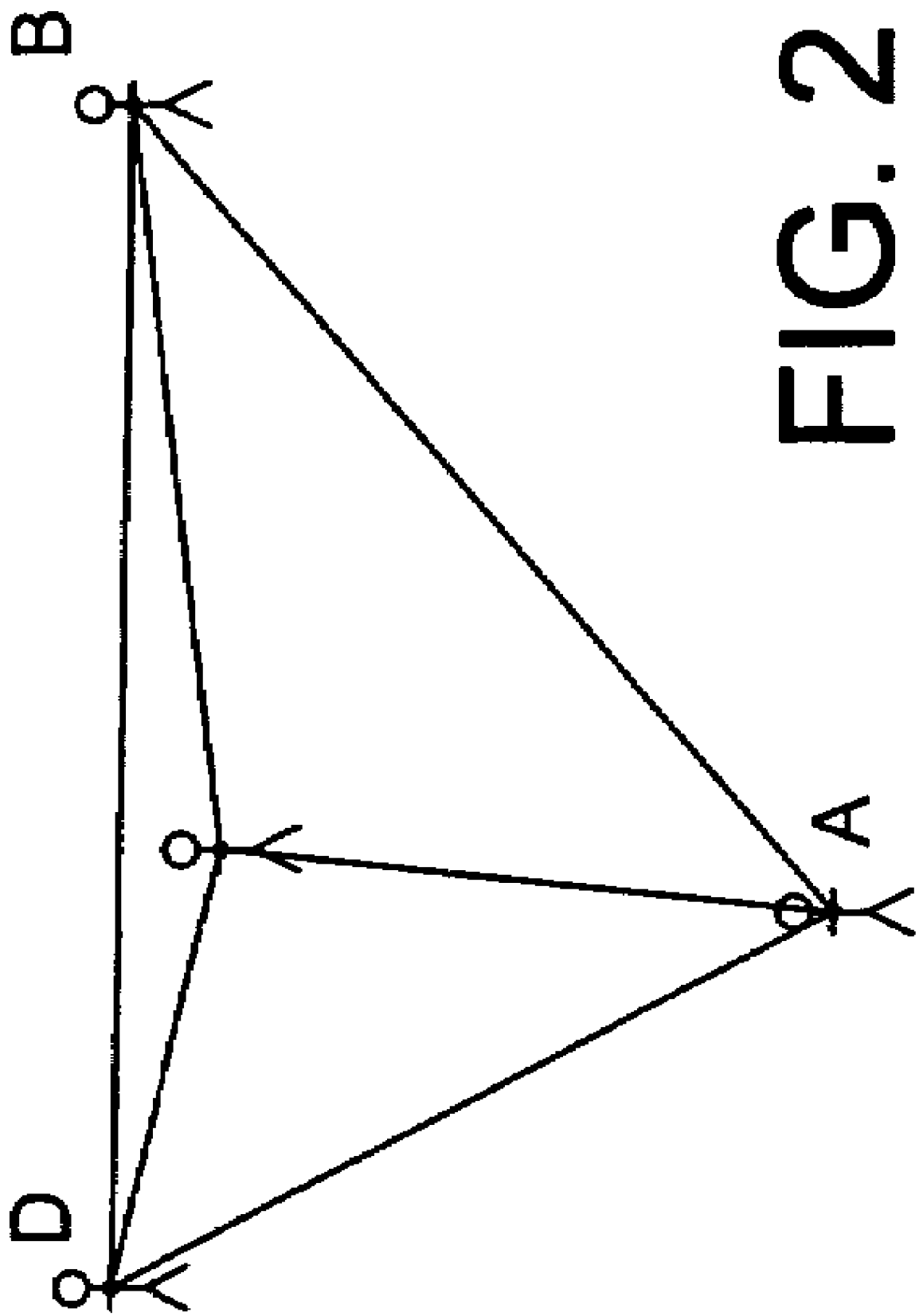
FIG. 2 is an illustration of a group of individuals, each of which is carrying a mobile communications device in accordance with a preferred embodiment of the present invention, as a constellation of points in three-dimensional space.

In accordance with the present invention, relative positions of individuals in a group, where each individual carries a mobile communications device for wirelessly communicating with each of the other individuals to form a group of networked mobiles, are determined at each of the mobiles without the use of external positioning information, such as GPS information, which oftentimes is unavailable at various locations where the group may be operating. FIG. 1 illustrates how a group of individuals A, B, C and D, such as police officers, firefighters, guards or soldiers, may be dispersed to locations in and around a multistory building, which is a typical environment in which GPS-based or like external electronic signal positioning systems may perform poorly or fail completely. If the position of each individual is represented as a point, the formation of the group can be viewed as a constellation of points in space as shown in FIG. 2. At any instant in time, the locations of the individuals uniquely define the three-dimensional shape of the true constellation. For purposes of illustrating the features of the present invention, it is assumed that each of the individuals in FIG. 2 carries a mobile communications device constructed and functioning in accordance with the present invention.

In accordance with a preferred embodiment of the present invention, the relative positions of individuals in a mobile networked group are determined at a mobile communications device 101 carried by each of the individuals in the group so long as the group includes at least four networked mobiles 101. The relative positions determination is performed at one mobile of the group based on collection of mobile-to-mobile range data, mobile movement data and altitude data at the one mobile, and receipt of altitude and movement data transmitted to the one mobile from each of the other mobiles in the group. Each of the mobiles uses the collected and received data to construct a virtual constellation having the same shape and orientation as the true constellation corresponding to the relative positions of the mobiles in the group.

Figure 3:
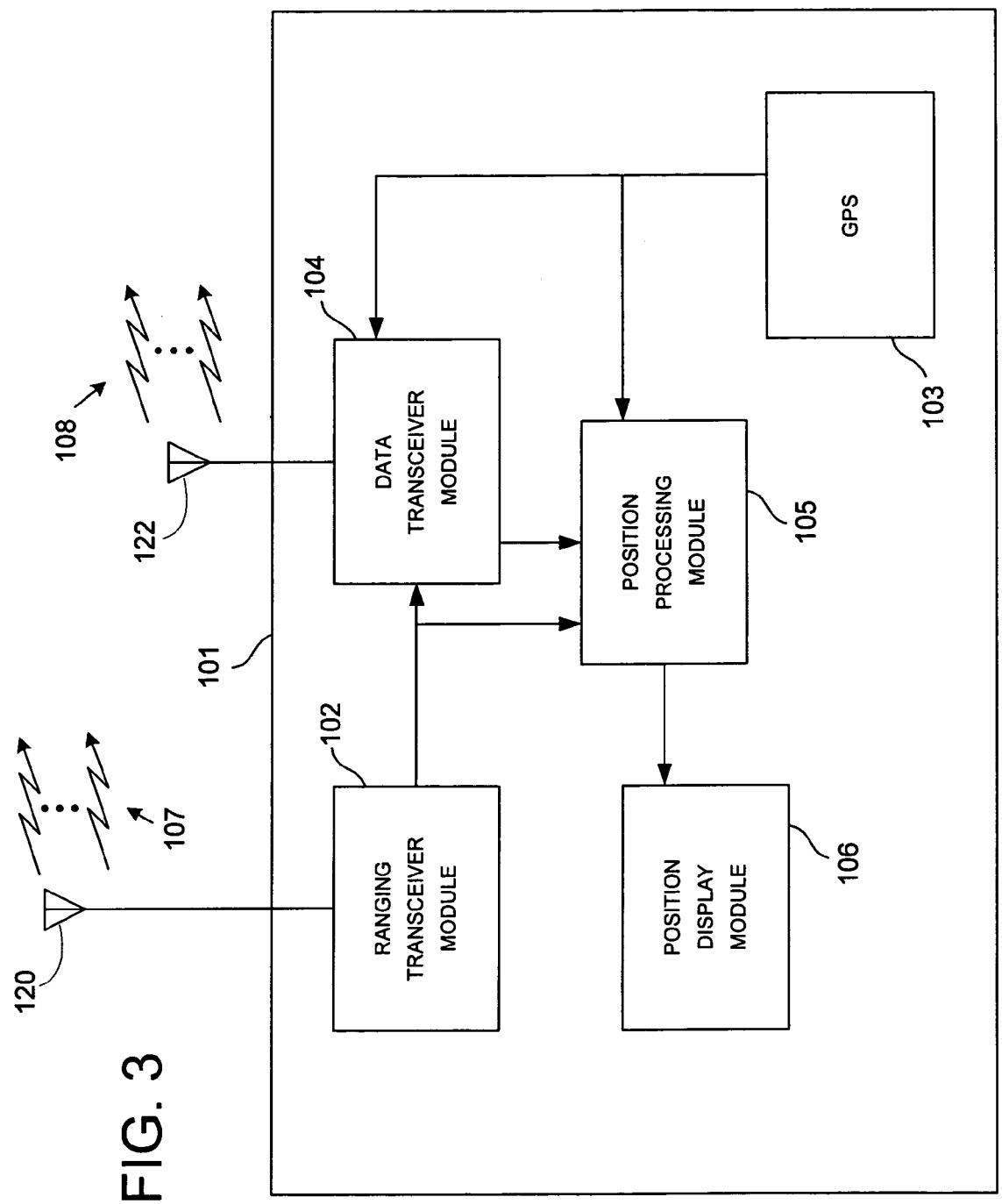
FIG. 3 is a functional block diagram of a mobile communications device in accordance with a preferred embodiment of the present invention.

FIG. 3 is a preferred embodiment of the mobile 101 in accordance with the present invention. Referring to FIG. 3, the mobile 101 includes a ranging transceiver module 102, a movement assessment module 103, a data transceiver module 104, a position processing module 105 and a position display module 106. The data transceiver module 104 is coupled to each of the ranging transceiver module 102, the movement assessment module 103 and the position processing module 105. The position processing module 105 is coupled to the position display module 106 and the movement assessment module 103. The ranging module 102 is coupled to an antenna 120 and the data transceiver module 104 is coupled to an antenna 122. It is to be understood that each of the modules of the inventive mobile 101, which are described below as performing data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in accordance with the present invention, the modules of the mobile 101 can be combined, as suitable, into composite modules. Also, the antennae 120 and 122, which are conventional devices well known in the prior art, can be combined into a single integral antenna, as is also well known in the art.

The ranging transceiver module 102, which includes a conventional wireless, such as a radio frequency ("RF") signal, receiver and transmitter, collects data for determining the distance between the mobile in which it is contained and each of the other mobiles in the networked group. In a preferred embodiment, the transceiver module 102 establishes, via the antenna 120, a radio ranging link 107 between itself and the transceiver module 102 of another mobile. Based on the radio raging links, the transceiver module 102 of the subject mobile measures the signal transit time between itself and the ranging transceiver modules of other respective mobiles in the group. From the signal time transit data, the range between two mobiles is readily computed using well known techniques.

In a preferred embodiment, the ranging transceiver module uses an RF carrier modulated by a high rate PN sequence for ranging. In another preferred embodiment, the signal used for ranging is an ultrawideband ("UWB") signal. UWB is advantageous because: (1) it provides virtually infinite frequency diversity, thus ensuring that the ranging signal can penetrate a wide variety of common building materials; (2) UWB signals have a low probability of detection and intercept; (3) the narrow pulse widths (500 psec) used in UWB allows for ranging accuracies to less than one foot; (4) and UWB signals can be used anywhere in the world without having to fit into or coordinate with local civilian and military frequency allocation plans.

The movement assessment module 103 includes an electronic compass and measures movement of the subject mobile in terms of distance and direction. In a preferred embodiment, the module 103 determines whether the mobile is not moving, moving in an unknown direction or moving in a known direction. In cases where a mobile is moving in a known direction, the movement assessment module 103 determines the direction. Further, the movement assessment module 103 measures the altitude of the subject mobile with respect to a reference altitude that is set when the mobile is initialized for use. In a preferred embodiment, the module 103 includes a barometric altimeter, such as commonly included in a Swiss army watch or portable GPS receivers, that uses pressure differences to measure relative altitude with respect to the altitude of a common calibration point which is set as the reference altitude.

The data transceiver module 104, which includes a conventional wireless, such as an RF signal, receiver and transmitter, exchanges, via the antenna 122, information between itself and the data transceiver modules 104 of other networked mobiles of the group. The data module 104 at each mobile transmits its altitude and movement measurements to the other mobiles via wireless data links 108 established between itself and the data transceiver modules 104 of the various mobiles. In a preferred embodiment where a ranging transceiver module of a subject mobile cannot directly measure mobile-to-mobile distance to another mobile, that other mobile, or alternatively another of the mobiles of the group, conveys this ranging information to the subject mobile over a wireless data link 108 established between its data transceiver module and the data transceiver module 104 of the subject mobile.

The position processing module 105 retrieves the ranging data from the module 102, the movement and altitude data collected at the module 103 and any range and the altitude data received at the module 104 to compute, as discussed in detail below, the relative positions of the networked mobiles.

The position display module 106 displays the relative positions of the networked mobiles which are computed at the processing module 105. In a preferred embodiment, the module 106 includes a display unit resembling an oversized ruggedized PDA. In a further preferred embodiment, the module 106 is not included in selected mobiles of a group.

In a preferred embodiment, the mobile of the present invention includes a first component structure, which does not include the antennae 120 and 122 and the movement assessment module 103, is approximately the size of a cordless telephone handset and is configured to be worn on or attached to an article of clothing. The movement assessment module 103 is embodied as a second component structure, preferably the same size or smaller than a cordless telephone handset and configured for attachment to a belt or belt loops on pants. The antennae 120 and 122 are embodied as a third component structure, preferably readily attachable to a shirt collar. The first, second and third component structures of the mobile are electronically coupled to one another. In a further preferred embodiment, the mobile component structures are configured to be carried in a holster to provide for easy removal for use.

In another preferred embodiment, the position display module 106 contains an electronic compass module (not shown). The compass module includes an electronic compass, which is a different electronic compass than the electronic compass included in the movement assessment module 103. The compass module processes the relative position data generated by the module 105 and suitably provides control signals to the display module 106 so that a graphical display of the computed relative positions is rotated to orient the displayed relative positions with the corresponding features in the actual environment, even if the display is pointed in different directions.

Figure 4:
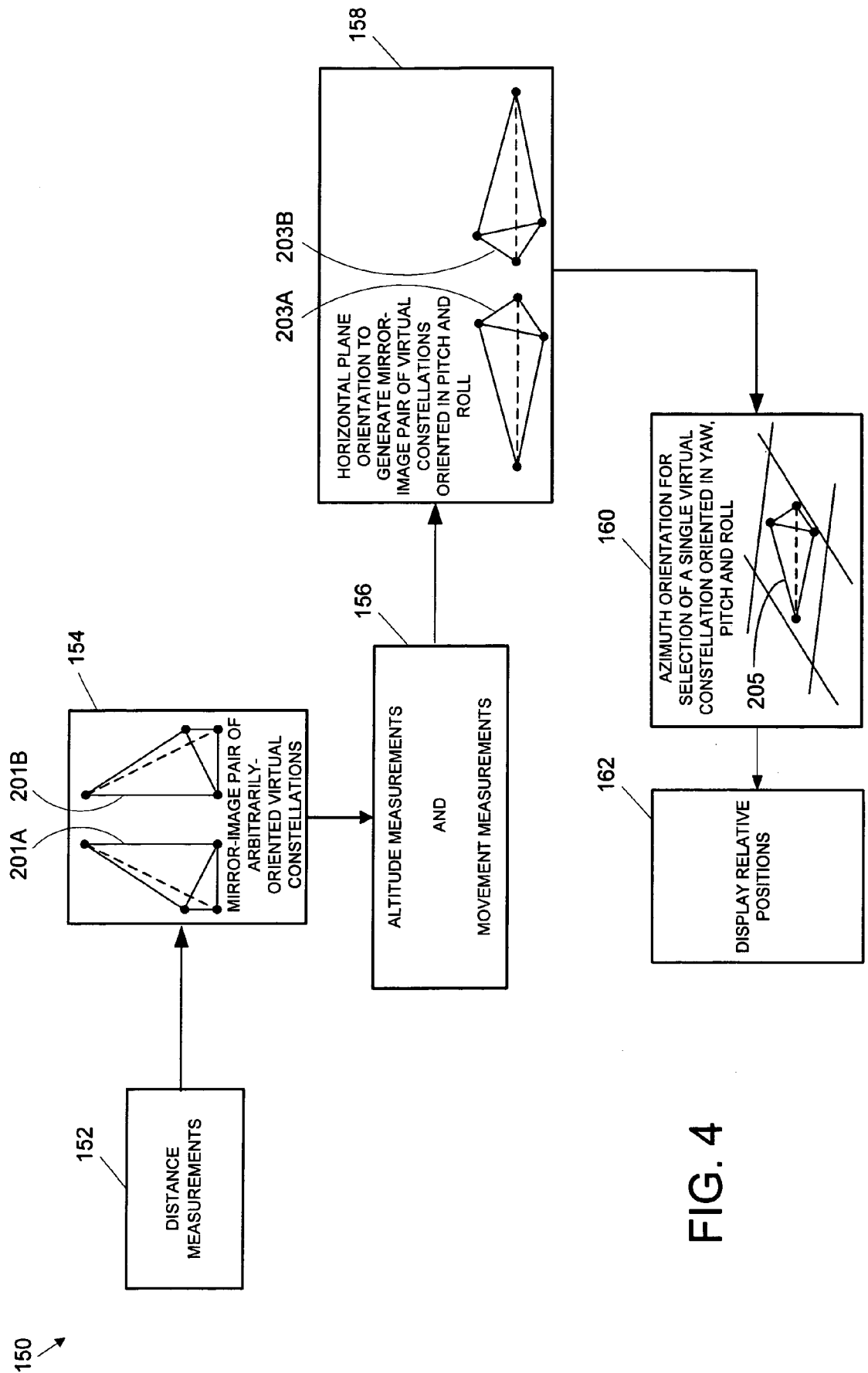
FIG. 4 is a flow diagram of a process for determining relative positions of a group of networked mobile communications devices in accordance with the present invention.

FIG. 4 is a high level flow process 150 illustrating measurement and collection of data and computations performed at each of the mobiles of a group of wirelessly networked mobiles, in accordance with the present invention, to determine the relative positions of the mobiles of the group. For purposes of illustrating the process 150 and the processes corresponding to steps of the process 150 which are described in further detail in the text accompanying the description of FIGS. 6–8, reference is made to the individuals A, B, C and D shown in FIG. 2 each of whom is carrying a mobile 101. Also, for ease of reference, the individuals of the group shown in FIG. 2 are referred to below as mobiles A, B, C, and D. It is also assumed that each of the mobiles 101 is in the form of a three part, electronically coupled unit including (i) a first unit of a movement assessment module 103, which is worn on the belt of an individual to ensure that an accelerometer within the movement assessment module 103 can sense foot steps, i.e., movement; (ii) a second unit of the antennae 120 and 122, which is worn on an upper portion of an individual's body to maximize signal transmission and reception capability; and (iii) a third unit containing the modules 102, 104, 105 and 106 and which can be worn virtually anywhere on the body of an individual.

Referring to FIG. 4, in step 152, each ranging transceiver module 102 measures mobile-to-mobile distance with respect to each of the mobiles in the group and stores in its memory the range with an associated time stamp. Alternatively, in step 152, the data transceiver module 104 in a first mobile, such as the mobile A, receives time stamped mobile-to-mobile range data from a second mobile, such as the mobile B or alternatively the mobiles C or D, based on mobile-to-mobile distance measurements made by the second mobile B with respect to first mobile A.

In step 154, the position processing module 105 uses the locally or the remotely measured mobile-to-mobile distances to computer a mirror-image pair of geometric shapes or virtual constellations 201A and 201B. One of the constellations is congruent to the actual true geometric shape 205 defined by the positions of the individual mobiles within the group and shown in FIG. 4 at step 160, which is discussed in detail below. In other words, based solely on the mobile-to-mobile range information, a mobile computes a virtual constellation of the estimated positions that has the same shape as the true constellation of the actual positions of the mobiles of the group. Thus, the range information permits that, to within a reflection, the geometric shape defined by the positions of the individual mobiles within the group can be determined.

The virtual constellation that the position processing module 105 in a mobile determines based on the mobile-to-mobile range information is in an arbitrary orientation that exhibits yaw, pitch, and roll with respect to the orientation of the true constellation. It is not possible to determine the orientation (yaw, pitch, roll) or absolute position (x, y, z) or (latitude, longitude, altitude) of this geometric shape solely based on the range information. The virtual constellation has an unobservable virtual North-South ("N-S") axis such that, when the virtual constellation is correctly oriented with respect to the true constellation, the virtual N-S axis will be parallel to the true N-S axis. Yaw is the angle, measured in the horizontal plane, between the true and virtual N-S axes. Similarly, the virtual constellation has an unobservable virtual up-down (U-D) axis, such that when the constellation is correctly oriented, the virtual U-D will be parallel to the true U-D axis. Pitch is the angle, measured in the vertical North-South plane, between the true and virtual U-D axes. Roll is the angle, measured in the verical East-West plane, between the true and virtual U-D axes.

Steps 156, 158 and 160 of the process 150 provide, in accordance with the present invention, that any potential reflective ambiguity of the two constellations is resolved and that the proper orientation of the geometric shape is determined without the use of GPS information. In step 156, the position processing module 105 in each of the mobiles collects movement and altitude data and stores such data with an associated time stamp in its memory. In addition, the mobiles of a group share their respective movement and altitude measurement data with one another via the wireless communication links 108 generated by the respective data transceiver modules 104.

In step 158, the position processing module 105 uses the locally and the remotely measured altitude data to determine, for each of the two images corresponding to the pair of virtual constellations, the proper orientation with respect to the horizontal plane. The result of applying horizontal orientation processing is a mirror-image pair of virtual constellations 203A and 203B which are oriented in pitch and roll.

In step 160, each position processing module 105 uses the locally and the remotely measured movement data to select the correct image from the mirror-image pair of virtual constellations and to determine the proper orientation of the selected image with respect to azimuth. In step 162, the position display module 106 provides output representative of the relative positions of the mobiles of the group, which were determined in step 160, on a monitor device.

In a preferred embodiment, the mobile continuously tracks the positions of the individuals within the group and displays these positions on a handheld device that resembles a large PDA. In a further preferred embodiment, the position processing module 105 routes the relative positions data representative of the true constellation to the data transceiver module 104 and the module 104 transmits, via the antenna 122, the relative positions of the mobiles to a remote command post.

Determining the Geometric Shape Defined by the Actual Positions of the Mobiles

Referring again to FIG. 4, in step 152 the ranging transceiver module 102 in each mobile of the group communicates with each of the other mobiles in the group to determine straight-line distance between the subject mobile and each of the other mobiles. For example, the ranging transceiver module in mobile A transmits a time encoded wireless signal, such as an RF signal, to the mobile B. Based on this transmission, the ranging transceiver module of the mobile B can measure the time it takes for an RF signal to propagate from the ranging transceiver module of the mobile A to the ranging transceiver module of the mobile B. After the ranging transceiver module 102 in the mobile B collects the suitable propagation time data, its data transceiver module 104 transmits this propagation time data to the data transceiver module 104 of the mobile A on an RF carrier signal. The mobiles A, B, C and D in the group, thus, in step 152 operate cooperatively in a network to collect the propagation time data necessary for determining the distances from each mobile to every other mobile in the group.

In step 154, based on the propagation time data collected for each of the mobiles, the position processing module at a mobile, for example the mobile A, computes the distance between the mobile A and each of the mobiles B, C and D. Based only on the mobile-to-mobile distance measurements at each of the mobiles of the group, and without any known fixed reference positions, the position processing module constructs a mirror-image pair of geometric shapes or virtual constellations which are defined by the positions of the individual mobiles within the group. If the distance measurements are exact, the pair of shapes will match exactly. In a practical system, however, some measurement error is likely. Preferably, the virtual constellations have a shape that is an optimal estimate of the shape of the true constellation of the actual positions of the mobiles of the group.

Figure 5B:
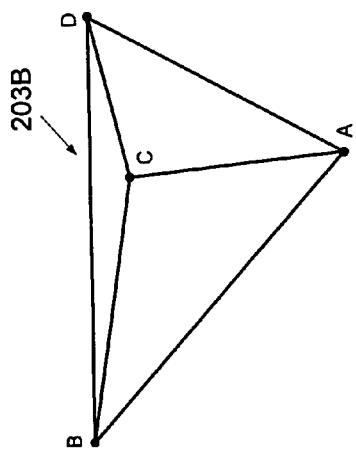
FIGS. 5A and 5B are true and mirror images, respectively, of a virtual constellation of the positions of the individuals of FIG. 2.
Figure 5A:
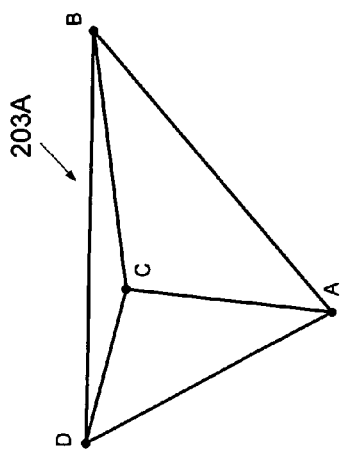

FIGS. 5A and 5B illustrate, respectively, a true image constellation 203A and a mirror image constellation 203B for the mobiles A, B, C and D as shown in FIG. 2. The constellation 203A, which for purposes of the example is the true geometric shape, matches the actual geometric shape of all of the mobiles in the group. Referring to FIG. 5A, which is the image of the virtual constellation pair representative of the true constellation corresponding to the mobiles shown in FIG. 2, the sequence of mobiles D, C and B is clockwise when viewed from mobile A. In the reflected image shown in FIG. 5B, the sequence of mobiles D, C and B is counterclockwise when viewed from mobile A.

In a preferred embodiment, the position processing module of a mobile, using the collected range information which has some measurement error, performs a linearized least squares computation to estimate the geometric shape defined by the positions of the various mobiles within a group. The use of a least squares computation generates an optimal estimate of the geometric shape in the presence of imperfect range measurements, because this estimate has the least squared range error of all the possible estimates that can be made from a set of imperfect measurements. The position processing module arbitrarily establishes a local coordinate system to facilitate the estimation. Within this local coordinate system, a pair of mobiles or nodes designated node $N_P$ and node $N_Q$ are located respectively at coordinate positions $(x_P, y_P, z_P)$ and $(x_Q, y_Q, z_Q)$. The estimated range between $N_A$ and $N_B$ can be calculated as $$\rho_{PQ} = \sqrt{(x_Q-x_P)^2 + (y_Q-y_P)^2 + (z_Q-z_P)^2} \quad (1)$$

The linear least squares computation requires an equation for range estimation error that is linear in the coordinates. Equation (1) can be linearized by generating a truncated Taylor series expansion about the estimated positions $(x_P, y_P, z_P)$ and $(x_Q, y_Q, z_Q)$. The series is truncated to eliminate all second and higher order terms to yield $$\rho_{PQ} = r_{PQ} + \frac{x_Q - x_P}{\rho_{PQ}} \partial x_Q + \frac{y_Q - y_P}{\rho_{PQ}} \partial x_Q + \frac{z_Q - z_P}{\rho_{PQ}} \partial x_Q + \frac{x_P - x_Q}{\rho_{PQ}} \partial x_P + \frac{y_P - y_Q}{\rho_{PQ}} \partial x_P + \frac{z_P - z_Q}{\rho_{PQ}} \partial x_P \quad (2)$$

where $r_{PQ}$ is the measured range between node $N_P$ and node $N_Q$. It is convenient to define the range estimation error as $R_{PQ} = \rho_{PQ} - r_{PQ}$ and restate Equation (2) as $$R_{PQ} = \frac{x_Q - x_P}{\rho_{PQ}} \partial x_Q + \frac{y_Q - y_P}{\rho_{PQ}} \partial x_Q + \frac{z_Q - z_P}{\rho_{PQ}} \partial x_Q + \frac{x_P - x_Q}{\rho_{PQ}} \partial x_P + \frac{y_P - y_Q}{\rho_{PQ}} \partial x_P + \frac{z_P - z_Q}{\rho_{PQ}} \partial x_P \quad (3)$$

In a preferred embodiment, the shape is estimated by using the positions of three mobiles to define the axes of the local coordinate system in a particular way. The local node, i.e., the particular mobile performing the estimation, designated node $N_0$, is placed at the origin of the local coordinate system so that $x_0 = 0$, $y_0 = 0$ and $z_0 = 0$. The first remote node that the local node is able to range is designated as node $N_1$. This node is placed on the positive x axis of the local coordinate system so that $y_1 = 0$ and $z_1 = 0$, and the range estimation error Equation (3) for $N_0$ and $N_1$ simplifies to $$R_{0,1} = \frac{x_1}{\rho_{0,1}} \partial x_1$$

The second remote node that the local node is able to range is designated as node $N_2$. This node is placed in the x-y plane of the local coordinate system, so $z_2 = 0$ and the range estimation error for $N_0$ and $N_2$ simplifies to $$R_{0,2} = \frac{x_2}{\rho_{0,2}} \partial x_2 + \frac{y_2}{\rho_{0,2}} \partial y_2$$

The range estimation error for $N_1$ and $N_2$ simplifies to $$R_{1,2} = \frac{x_1 - x_2}{\rho_{1,2}} \partial x_1 + \frac{x_2 - x_1}{\rho_{1,2}} \partial x_2 + \frac{y_2}{\rho_{1,2}} \partial y_2$$

Once the local coordinate system is fixed by the positions of the local node and the first two remote nodes, the positions of all other remote nodes are not constrained with respect to the local coordinate axes. The range estimation error from one unconstrained remote node to another will include all six terms shown in Equation (3). The range estimation error from node $N_0$ to an unconstrained node simplifies to the form $$R_{0,P} = \frac{x_P}{\rho_{0,P}} \partial x_P + \frac{y_P}{\rho_{0,P}} \partial y_P + \frac{z_P}{\rho_{0,P}} \partial z_P$$

The range estimation error from node $N_1$ to an unconstrained node simplifies to the form $$R_{1,P} = \frac{x_1 - x_P}{\rho_{1,P}} \partial x_1 + \frac{x_P - x_1}{\rho_{1,P}} \partial x_P + \frac{y_P}{\rho_{1,P}} \partial y_1 + \frac{z_P}{\rho_{1,P}} \partial z_1$$

The range estimation error from node $N_2$ to an unconstrained node simplifies to the form $$R_{2,P} = \frac{x_2 - x_P}{\rho_{2,P}} \partial x_2 + \frac{y_2 - y_P}{\rho_{2,P}} \partial y_2 + \frac{x_P - x_2}{\rho_{2,P}} \partial x_P + \frac{y_P - y_2}{\rho_{2,P}} \partial y_P + \frac{z_P - z_2}{\rho_{2,P}} \partial z_P$$

The system of equations for range estimation error can be put in matrix form as $$R = \alpha d \quad (4)$$

where $$R = \begin{bmatrix} R_0 \\ R_1 \\ \vdots \\ R_{N-1} \end{bmatrix} \quad R_k = \begin{bmatrix} R_{k,k+1} \\ R_{k,k+2} \\ \vdots \\ R_{k,N-1} \end{bmatrix} \quad (5)$$

$$d = [\partial x_1 \ \partial x_2 \ \partial y_2 \ \partial x_3 \ \partial y_3 \ \partial z_3 \ \cdots \ \partial x_{N-1} \ \partial y_{N-1} \ \partial z_{N-1}]$$

$$\alpha = \begin{bmatrix} \alpha_0 \\ \alpha_1 \\ \alpha_2 \\ \alpha_3 \\ \vdots \\ \alpha_{N-2} \end{bmatrix}$$

and the submatrices $\alpha_0$ through $\alpha_{N-2}$ are configured as shown below $$\alpha_0 = \begin{bmatrix} \frac{x_1}{r_{0,1}} & 0 & 0 & 0 & 0 & 0 \\ & \frac{x_2}{r_{0,2}} & \frac{y_2}{r_{0,2}} & & & \\ & & & \frac{x_3}{r_{0,3}} & \frac{y_3}{r_{0,3}} & \frac{z_3}{r_{0,3}} \\ & & & & & \ddots \\ & & & & & & \frac{x_{N-1}}{r_{0,N-1}} & \frac{y_{N-1}}{r_{0,N-1}} & \frac{z_{N-1}}{r_{0,N-1}} \end{bmatrix}$$

$$\alpha_1 = \begin{bmatrix} \frac{x_1-x_2}{\rho_{1,2}} & \frac{x_2-x_1}{\rho_{1,2}} & \frac{y_2}{\rho_{1,2}} & 0 & 0 & 0 & \cdots & 0 & 0 & 0 \\ \frac{x_1-x_3}{\rho_{1,3}} & 0 & 0 & \frac{x_3-x_1}{\rho_{1,3}} & \frac{y_3}{\rho_{1,3}} & \frac{z_3}{\rho_{1,3}} & \cdots & 0 & 0 & 0 \\ \vdots & & & & \vdots & & \ddots & & & \\ \frac{x_1-x_{N-1}}{\rho_{1,N-1}} & 0 & 0 & 0 & 0 & 0 & & \frac{x_{N-1}-x_1}{\rho_{1,N-1}} & \frac{y_{N-1}}{\rho_{1,N-1}} & \frac{z_{N-1}}{\rho_{1,N-1}} \end{bmatrix}$$

$$\alpha_2 = \begin{bmatrix} 0 & \frac{x_2-x_3}{\rho_{2,3}} & \frac{y_2-y_3}{\rho_{2,3}} & \frac{x_3-x_2}{\rho_{2,3}} & \frac{y_3-y_2}{\rho_{2,3}} & \frac{z_3}{\rho_{2,3}} & 0 & 0 & 0 & 0 & 0 & 0 \\ 0 & \frac{x_2-x_4}{\rho_{2,4}} & \frac{y_2-y_4}{\rho_{2,4}} & 0 & 0 & 0 & \frac{x_4-x_2}{\rho_{2,4}} & \frac{y_4-y_2}{\rho_{2,4}} & \frac{z_4}{\rho_{2,4}} & 0 & 0 & 0 \\ \vdots & \vdots & \vdots & & & & & & & \ddots & & & \\ 0 & \frac{x_2-x_{N-1}}{\rho_{2,N-1}} & \frac{y_2-y_{N-1}}{\rho_{2,N-1}} & 0 & 0 & 0 & 0 & 0 & 0 & \frac{x_{N-1}-x_2}{\rho_{2,N-1}} & \frac{y_{N-1}-y_2}{\rho_{2,N-1}} & \frac{z_{N-1}}{\rho_{2,N-1}} \end{bmatrix}$$

$$\alpha_k = \begin{bmatrix} 0_k & \begin{vmatrix} \frac{x_k-x_{k+1}}{\rho_{k,k+1}} & \frac{y_k-y_{k+1}}{\rho_{k,k+1}} & \frac{z_k-z_{k+1}}{\rho_{k,k+1}} & \frac{x_{k+1}-x_k}{\rho_{k,k+1}} & \frac{y_{k+1}-y_k}{\rho_{k,k+1}} & \frac{z_{k+1}-z_k}{\rho_{k,k+1}} & 0 & 0 & 0 & 0 & 0 & 0 \\ \frac{x_k-x_{k+2}}{\rho_{k,k+2}} & \frac{y_k-y_{k+2}}{\rho_{k,k+2}} & \frac{z_k-z_{k+2}}{\rho_{k,k+2}} & 0 & 0 & 0 & \frac{x_{k+2}-x_k}{\rho_{k,k+2}} & \frac{y_{k+2}-y_k}{\rho_{k,k+2}} & \frac{z_{k+2}-z_k}{\rho_{k,k+2}} & 0 & 0 & 0 \\ & & & & & & & & & \ddots & & \\ \frac{x_k-x_{N-1}}{\rho_{k,N-1}} & \frac{y_k-y_{N-1}}{\rho_{k,N-1}} & \frac{z_k-z_{N-1}}{\rho_{k,N-1}} & 0 & 0 & 0 & 0 & 0 & 0 & \frac{x_{N-1}-x_k}{\rho_{k,N-1}} & \frac{y_{N-1}-y_k}{\rho_{k,N-1}} & \frac{z_{N-1}-z_k}{\rho_{k,N-1}} \end{vmatrix} \end{bmatrix}$$

For the general case of N>2 nodes, the number of range equations will be $$N_{eqn} = \frac{N(N-1)}{2}$$

and the number of unknown coordinates will be $$N_{unk} = 3(N-2)$$

The system of equations will be overspecified for systems involving five or more nodes. When the system is overspecified, the best solution in a least squares sense can be found using the normal equation to solve Equation (4) for d where $$d = [\alpha^T \alpha]^{-1} \alpha^T R \quad (6)$$

Figure 6:
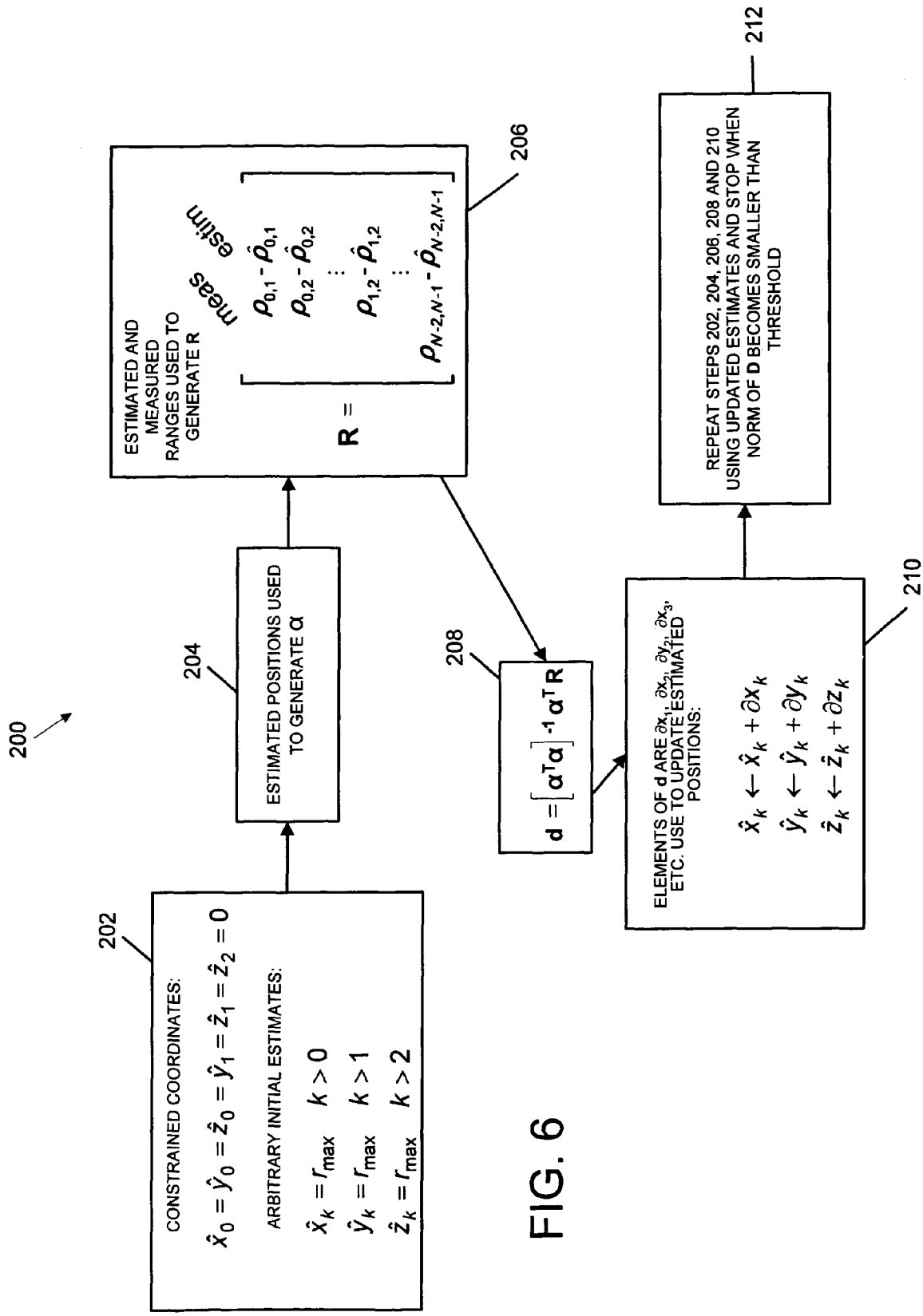
FIG. 6 is a flow diagram of a process for determining the geometric shape defined by the actual positions of a group of networked mobiles in accordance with the present invention.

In a preferred embodiment, the position processing module 105 in a mobile, at step 154 of the process 150, performs a computation process 200, as shown in FIG. 6, to construct the virtual constellations. Referring to FIG. 6, in step 202, the position processing module 105 assumes a set of starting position estimates (x,y,z) for each of the nodes in the group. Node $N_o$ is constrained to lie at (0,0,0). Node $N_1$ is started at ($r_{max}$,0,0) where $r_{max}$ is the maximum distance at which ranging can be performed. Node $N_2$ is started at ($r_{max}$,$r_{max}$,0) and all other nodes are started at ($r_{max}$,$r_{max}$,$r_{max}$).

In step 204, the position processing module 105 computes an estimated range for each pair of nodes i and j $$\rho_{i,j} = \sqrt{(x_i-x_j)^2+(y_i-y_j)^2+(z_i-z_j)^2} \quad (1)$$

and forms the a matrix in accordance with Equation (5) and the equations for the submatrices $\alpha_0$ through $\alpha_{N-2}$ discussed above.

In step 206, the position processing module 105 forms the range estimation error vector from the differences between the estimated ranges and the corresponding measured ranges $$R_{i,j} = \rho_{i,j} - r_{i,j}$$

In step 208, the position processing module 105 uses the a matrix from step 204 and the range error vector R from step 206 to compute the position adjustment vector d as $$d = [\alpha^T \alpha]^{-1} \alpha^T R \qquad (6)$$

In step 210, the position processing module 105 applies the adjustment values in d to the corresponding estimates $$(x_k)_{new} = (x_k)_{old} + \partial x_k K = 1, 2, \ldots, N-1$$

$$(y_k)_{new} = (x_k)_{old} + \partial x_k K = 2, 3, \ldots, N-1$$

$$(z_k)_{new} = (x_k)_{old} + \partial X_k K = 3, 4, \ldots, N-1$$

In step 212, the position processing module 105 repeats steps 202, 204, 206, 208 for a predetermined number of iterations or until the RMS value of the adjustment vector falls below some predetermined threshold. In step 212, the estimated positions $(x_k, y_k, z_k)$ are the estimated positions of the nodes which define one image of the mirror-image pair of geometric shapes corresponding to the shape defined by the positions of the individual mobiles within the group, such as shown in FIG. 5A. The position processing module 105 generates a second image in the mirror-image pair, such as shown in FIG. 5B, by negating either the x, y, or z coordinate in every node position $(x_k, y_k, z_k)$. Negating every x coordinate reflects the image through the y-z plane. Negating every y coordinate reflects the image through the x-z plane. Negating every z coordinate reflects the image through the x-y plane. As the local coordinate system is arbitrary, any one of these reflections can be utilized as the second image in the mirror-image pair.

Horizontal Orientation of the Virtual Constellation

In accordance with the present invention, altitude data measured at each of the mobiles and then communicated to the other mobiles of the networked group is used in step 158 or the process 150 to orient the virtual constellation, such as determined by the process 200 performed at step 154 of the process 150, with respect to the true horizontal plane. The virtual constellation is rotated in virtual space to find the orientation of the virtual constellation that results in the best fit of virtual relative altitudes to measured relative altitudes. In this orientation, the pitch and roll of the virtual constellation is approximately zero. For ease of reference herein, a virtual constellation that has been so aligned is referred to as a pitch-and-roll aligned ("PRA") constellation. The optimization of the fit is preferably performed using at least one of a linear least squares estimation, a non-linear least squares estimation, a minimum mean squared error estimation, a method of moments estimation, a maximum likelihood estimation and a minimum variance estimation, which are well known mathematical techniques for optimizing an estimation.

Figure 7:
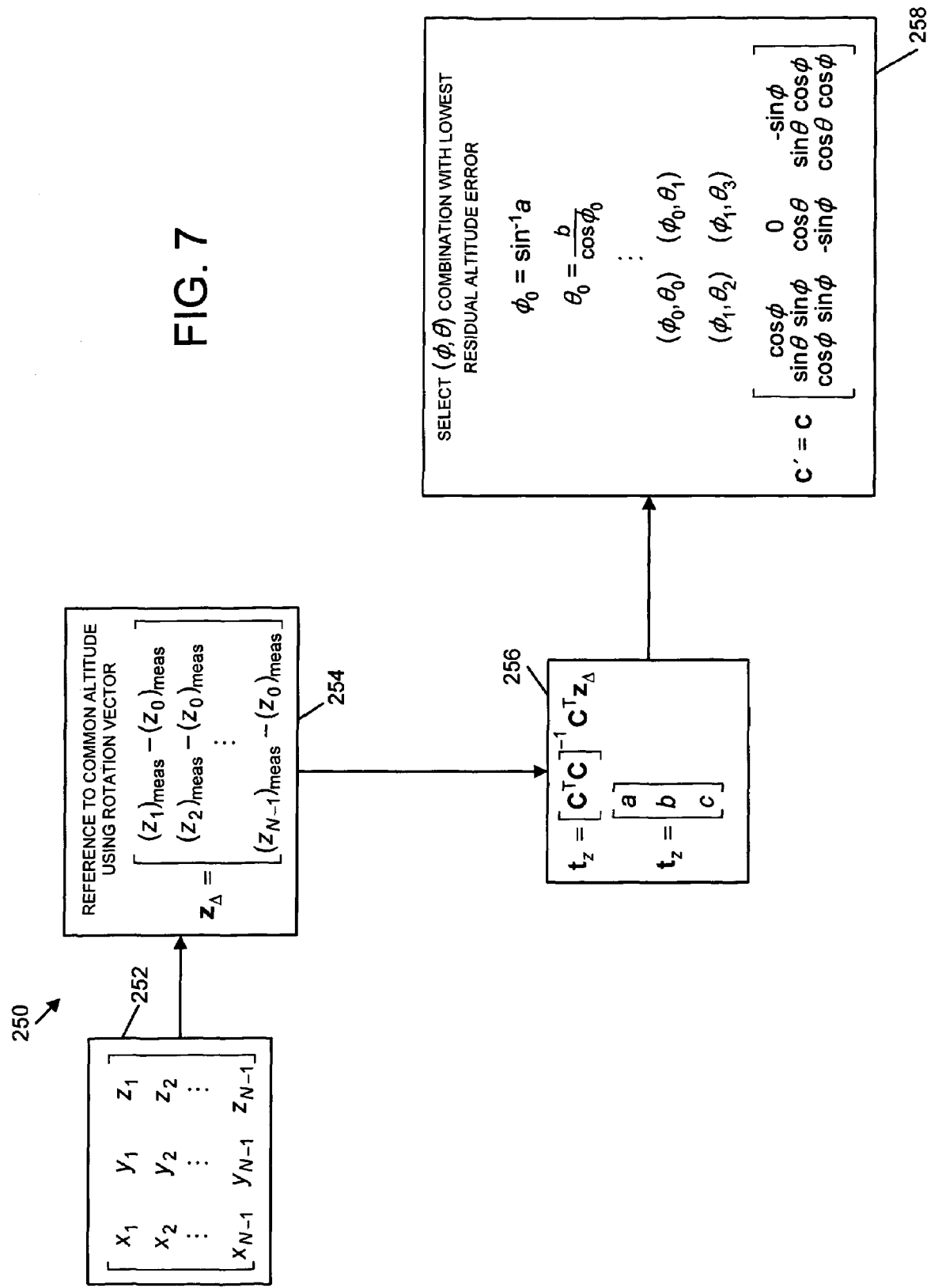
FIG. 7 is a flow diagram of a process for horizontally orienting estimated geometric shapes of a group of networked mobiles in accordance with the present invention.

FIG. 7 illustrates an exemplary process 250 for horizontally orienting the pair of mirror image constellations obtained in accordance with the present invention based on altitude data collected at the movement assessment module at each mobile of a networked group and without using any GPS fixes. Referring to FIG. 7, in step 252 the position processing module 105 of a mobile, such as the mobile A of FIG. 2, defines a virtual constellation of N discrete points in three-dimensional space in the form of an N×3 matrix C. Each row of C represents one point, and the column entries are the x, y, and z coordinates of the points.

In step 254, the position processing module 105 rotates the original constellation about the x and y axes to generate a vector of rotated z coordinates, where the z coordinates of the rotated constellation are a good match for the measured altitudes of the corresponding nodes in the actual deployment of the mobiles. If the rotation angle about the x axis is θ, and the rotation angle about the y axis is φ, then the vector of rotated z coordinates can be obtained from C as $$z = Ct_z \qquad (7)$$

where $$t_z = \begin{bmatrix} -\sin\phi \\ \sin\theta \cos\phi \\ \cos\theta \cos\phi \end{bmatrix}$$

In step 256, the position processing module 105 of the mobile, such as the mobile A, references the measured altitudes of the other mobiles, such as the mobiles B, C and D, to the measured altitude of the mobile A to compute the optimal rotation by finding the least squares solution for $t_z$ in $$z_m = Ct_z$$

where $z_m$ is the vector of measured altitudes referenced to the measured altitude of the local mobile unit. This solution is readily found as $$t_z = [C^T C]^{-1} C^T z_m \qquad (8)$$

and the result obtained from Equation (8) will be a three-element column vector $$t_z = \begin{bmatrix} a \\ b \\ c \end{bmatrix}$$

In step 258, the position processing module 105 solves for φ as $$\phi = \sin^{-1} a$$

For $-1 < a < 1$, the equation $a = \sin \phi$ has two solutions for φ in the range $-\pi$ to $\pi$. If this primary value is designated as $\phi_0$, then the second value can be obtained as $$\phi_1 = \begin{cases} \pi - \phi_0 & \phi_0 \geq 0 \\ -\pi - \phi_0 & \phi_0 < 0 \end{cases}$$

For $-1 < b < 1$, the equation $b = \sin \theta \cos \phi$ will have four solutions for θ in the range $-\pi$ to $\pi$. There will be two solutions for θ for each of the two possible values of φ:

$$\theta_0 = \sin^{-1}\frac{b}{\cos\phi_0}$$

$$\theta_1 = \begin{cases} \pi - \theta_0 & \theta_0 \geq 0 \\ -\pi - \theta_0 & \theta_0 < 0 \end{cases}$$

$$\theta_2 = \sin^{-1}\frac{b}{\cos\phi_1}$$

$$\theta_3 = \begin{cases} \pi - \theta_2 & \theta_2 \geq 0 \\ -\pi - \theta_2 & \theta_2 < 0 \end{cases}$$

The original virtual constellation is double-rotated four different ways corresponding to the four different combinations of $\phi$ and $\theta$: $(\phi_0, \theta_0)$, $(\phi_0, \theta_1)$, $(\phi_1, \theta_2)$ and $(\phi_1, \theta_3)$. The double-rotation that results in the smallest mean-squared altitude error is deemed to be the correct rotation.

Orienting the Virtual Constellation with Respect to Azimuth

Continuing with the illustrative example, it is assumed that the horizontal orientation procedures described above have already been applied to the mirror-image pair of virtual constellations to produce the oriented pair of virtual constellations 203A and 203B, as shown in FIGS. 5A and 5B, respectively, which are pitch-and-roll aligned. In accordance with the present invention, the virtual constellations 203 are subsequently rotated around the z axis to bring virtual azimuths observed in the constellations into alignment with azimuths measured in the actual deployment of the mobiles of the group to yield a single virtual constellation 205 that is properly oriented in yaw, pitch and roll.

It is noted that resolution of mirror-image ambiguity in the virtual constellations can be readily performed based on prior art techniques for determining the yaw of the PRA constellation relative to the true constellation if mobiles at three or more different latitude and longitude positions, which do not all lie in a straight line, can obtain GPS location fixes. A GPS receiver, by itself, must be able to receive the direct path signal from at least four satellites in the GPS constellation to obtain a GPS location fix. The three GPS fixes define a triangle in which the three fix points are in a particular sequence when viewed from above. As the two GPS fixes define a line of known length and azimuth, the virtual PRA constellation can be virtually rotated until the corresponding virtual line has the same azimuth as the line defined by the GPS fixes. The corresponding points in the virtual constellation proceed in the same sequence in the correct image and in the reverse sequence in the incorrect image. By examining these sequences in both images, the image that yields the reversed sequence is readily discarded.

In an alternative preferred embodiment, the networked mobiles of a group further include GPS capability and exchange information as to their relative positions with respect to the other mobiles of the group. Two GPS receivers working cooperatively can each obtain a position fix when, together, they can receive the direct path from as few as three satellites, provided that there are a total of at least five receivable satellite-to-receiver direct paths. See "Method and System for Determining Absolute Positions of Mobile Communications Devices Using Remotely Generated Positioning Information," U.S. Ser. No. 10/639,022, filed Aug. 11, 2003 and assigned to the assignee of this application, incorporated by reference herein.

Figure 8:
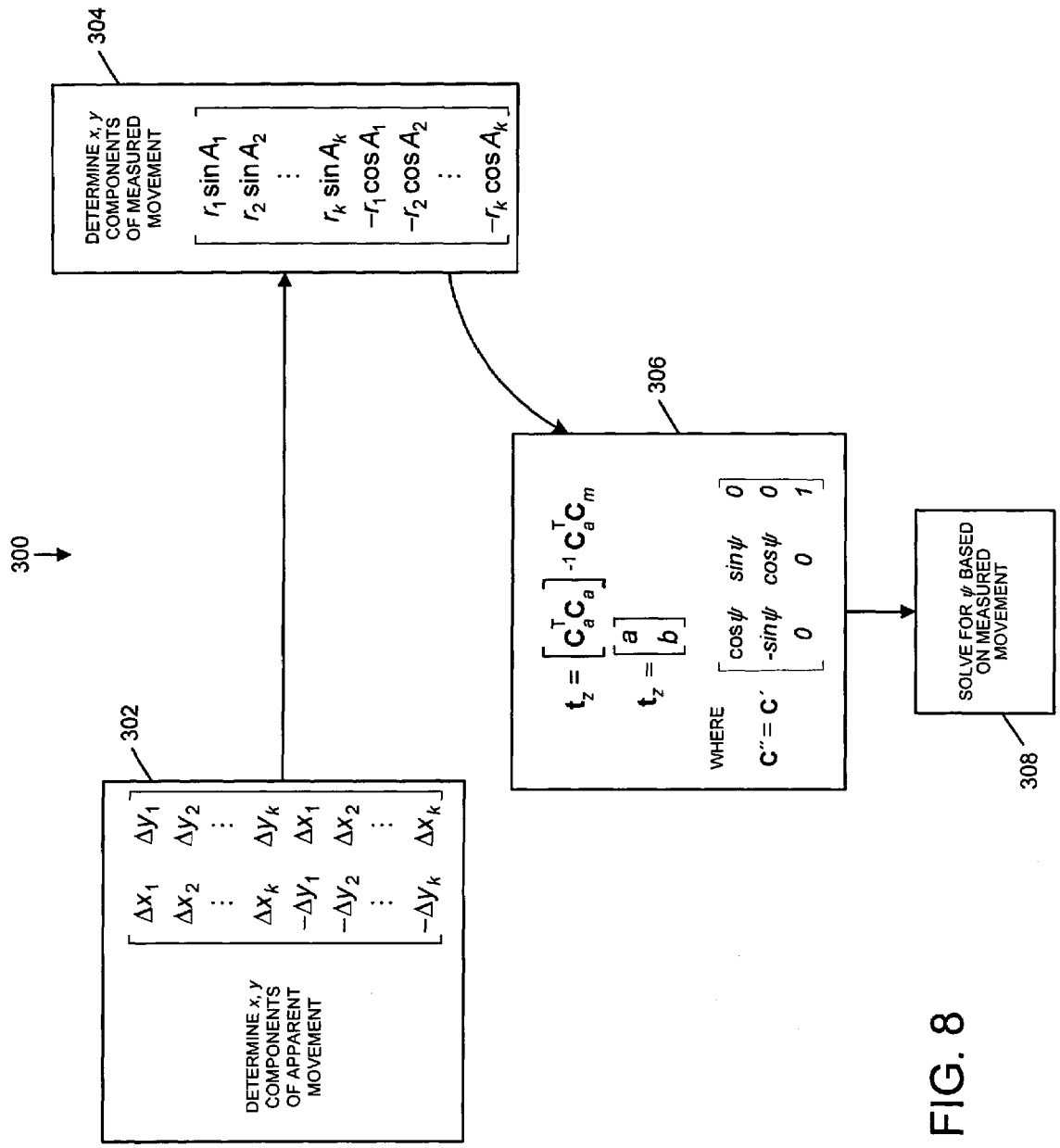
FIG. 8 is a flow diagram of a process for orienting estimated geometric shapes of a group of networked mobiles with respect to azimuth.

A flow process 300 for orienting the horizontally oriented virtual constellations with respect to azimuth without GPS information, and based on movement measurements in accordance with the present invention, thereby identifying a single virtual constellation oriented in yaw, pitch and roll, such as the relative positions of the mobiles A, B, C and D, is shown in FIG. 8.

In a preferred embodiment, the movement assessment module 103 includes an electronic pedometer, such as described in U.S. Pat. No. 5,583,776, incorporated by reference herein, as well as an electronic compass and a barometric altimeter. The movement assessment module 103 uses the pedometer in conjunction with the compass to determine the distance and direction the mobile moves when the individual carrying the mobile walks or runs in a forward direction, as such forward movements generally are accurate measurements of movement. The movement assessment module 103 distinguishes when the individual is stationary or moving in some manner other than forward walking or running and discards these measurements. Thus, unlike the prior art technique of using pure dead reckoning to measure movement, which requires estimating the direction and distance of movement other than forward walking or running, the present invention tracks mobile positions without requiring accurate estimates of direction and distance traveled when the individual is moving in some manner other than normal forward walking or running.

In a preferred embodiment, the movement assessment module includes an altimeter, a solid state electronic compass and three accelerometers. One of the accelerometers is mounted vertically and configured to act as a pedometer for detecting the foot impacts generated while walking, as is known in the art. The other two accelerometers are mounted horizontally, one oriented front-to-back and the other one oriented left-to-right. The measurements performed at the horizontal accelerometers are used to screen the foot impact indications provided by the vertical accelerometer to provide that normal forward walking or running can be distinguished from all other movements. During periods of normal forward movement, the average azimuth indicated by the electronic compass is a good estimate of the direction of travel.

Figure 9B:
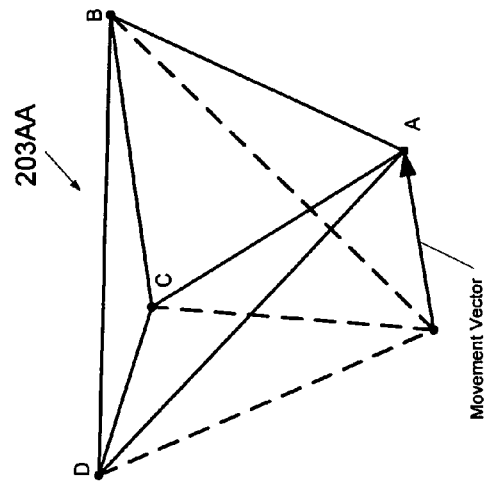
FIG. 9B is a constellation representative of the individuals of FIG. 2 after movement of the mobile A.
Figure 9A:
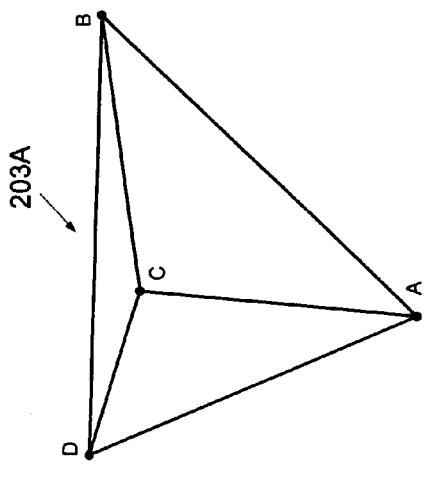
FIG. 9A is constellation representative of the individuals of FIG. 2 before movement of the mobile A.

For example, when an individual walks or runs in a forward direction, this movement is evidenced in the virtual constellation as a change from the constellation shape before the movement to the constellation shape after the movement. The virtual constellation can be rotated around the z axis until the line of apparent movement coincides with the compass-measured direction of the motion of the individual. FIG. 9A illustrates the original constellation 203A of the mobiles A, B, C and D of FIG. 2 before movement, and FIG. 9B illustrates a constellation 203AA in which the mobile A has moved while the mobiles B, C, and D remain fixed. As described below in connection with the process 300 illustrated in FIG. 8, the constellation corresponding to the end of the movement interval is rotated in azimuth until the movement vector of the individual has a virtual azimuth that agrees with the azimuth measured by the electronic compass in the mobile of the individual. The rotation effectively orients the entire constellation for all of the individuals in the group. It is noted that any single measurement will include some measurement error and, therefore, in a preferred embodiment, the computation includes a best-fit rotation based on multiple simultaneous movements reported by different mobiles. In a further preferred embodiment, the optimal rotation for a single yaw adjustment opportunity is found using least squares estimation techniques. In alternative preferred embodiments, an angular rotation is estimated for orienting the horizontally oriented virtual constellation by performing at least one of a linear least squares estimation, a non-linear least squares estimation, a minimum mean squared error estimation, a method of moments estimation, a maximum likelihood estimation and a minimum variance estimation, which are well know techniques for optimizing an estimation.

In converting between compass azimuths and angles in the Cartesian plane, it is customary to equate North with the positive y direction and East with the positive x direction. Standard angles in the Cartesian plane are measured counter-clockwise from the positive x axis. Under these conventions, the azimuth A (in degrees) and standard angle $\theta$ (also in degrees) are related by $$\theta = 90 - A$$

$$A = 90 - \theta$$

If the mobile A moves a distance of r at an azimuth of A, the x and y components of this movement are $$d_x = r \cos\theta = r \sin A$$

$$d_y = r \sin\theta = r \cos A$$

Within the virtual constellation, the position of mobile unit k at time $t_1$ is $(X_k(t_1), y_k(t_1))$ and the position at time $t_2$ is $(X_k(t_2), y_k(t_2))$.

Referring to FIG. 8, in step 302 the position processing module 105 generates a vector $d_a$ representative of the apparent movement of the mobile k (such as the mobile A) as evidenced by changes in the virtual constellation, where $$d_a = \langle x_k(t_2) - x_k(t_1), y_k(t_2) - y_k(t_1) \rangle \quad (9)$$

In step 304, the position processing module 105 generates a vector $d_m$ representative of the measured movement of the mobile k where the mobile k has moved a distance of r at an azimuth of A, such that $$d_m = \langle r_k \sin A_k, r_k \cos A_k \rangle \quad (10)$$

In a preferred embodiment of the present invention, the frequency and duration of opportunities to adjust the yaw of the PRA constellations will vary. A yaw adjustment opportunity occurs whenever there are intervals of time, e.g., several seconds, over which one or more individuals with mobiles perform regular movement while several other individuals with mobiles are not moving. The movement assessment module monitors movement status of the individual at any instant and categorizes the status as: (1) not moving; (2) regular movement for which a direction and a distance can be measured with high confidence; (3) quasi-regular movement for which a direction and distance can be measured with reduced confidence; and (4) irregular movement for which direction and/or distance cannot be reliably measured. For example, an electronic compass of an individual measures whether an individual regularly moves in a certain direction. The position of this individual relative to the non-moving individuals is determined at the beginning and the end of the regular movement interval. These two positions define the beginning and end of the individual's line of apparent regular movement, or movement vector ("MV"), through the fixed background of the constellation. Overall, several different azimuths and movement vectors can be obtained. If all of the movement measurements were perfect, one azimuthal rotation of the virtual constellation would bring each of the movement vectors into alignment with its corresponding measured azimuth. In reality, the measurements will not be perfect and each MV azimuth pair may indicate a different amount of azimuth rotation is needed to bring the PRA constellation into alignment.

In still a further preferred embodiment, the movement assessment module includes an inclinometer which collects information to permit the movement assessment module to distinguish between the individuals' movements in erect and prone positions.

Referring again to FIG. 8, in step 306, the position processing module 105 determines the alignment relationship between the apparent movement and measured movement vectors. If the virtual constellation is properly oriented with respect to the actual deployment, the two movement vectors are parallel to each other. If the virtual constellation has been oriented with respect to the horizontal plane, but not with respect to azimuth, then the two movement vectors can be brought into alignment by rotating the virtual constellation around the z axis through an angle of $\psi$. It is a well known result from analytic geometry that the relationship between the vectors can be expressed as $$d_a T_z = d_m$$

where $$d_a = [x_k(t_2) - x_k(t_1) \quad y_k(t_2) - y_k(t_1)]$$

$$d_m = [r_k \sin A_k \quad r_k \cos A_k]$$

$$T_z = \begin{bmatrix} \cos\psi & \sin\psi \\ -\sin\psi & \cos\psi \end{bmatrix}$$

This result can be extended to the case of k mobiles moving during the time interval from $t_1$ to $t_2$:

$$D_a T_z = D_m \quad (11)$$

where $$D_a = \begin{bmatrix} x_1(t_2) - x_1(t_1) & y_1(t_2) - y_1(t_1) \\ x_2(t_2) - x_2(t_1) & y_2(t_2) - y_2(t_1) \\ \vdots & \vdots \\ x_k(t_2) - x_k(t_1) & y_k(t_2) - y_k(t_1) \end{bmatrix} \quad (12)$$

$$D_m = \begin{bmatrix} r_1 \sin A_1 & r_1 \cos A_1 \\ r_2 \sin A_2 & r_2 \cos A_2 \\ \vdots & \vdots \\ r_k \sin A_k & r_k \cos A_k \end{bmatrix}$$

-continued $$T_z = \begin{bmatrix} \cos\psi & \sin\psi \\ -\sin\psi & \cos\psi \end{bmatrix}$$

When $D_a$ and $D_m$ are known, it is possible to use least squares techniques to solve for $T_z$ yielding $$T_z = \begin{bmatrix} a & b \\ c & d \end{bmatrix}$$

When solved in this unconstrained form, the constraints implied by Equation (12) of a=d, c=−b and $a^2+b^2=1$ may not be enforced. To eliminate redundant elements in $T_z$, Equation (11) can be reformulated such that the rotation matrix becomes a 2-element column vector:

$$C_a t_z = C_m \quad (13)$$

where $$t_z = \begin{bmatrix} \cos\psi \\ -\sin\psi \end{bmatrix}$$

$$C_a = \begin{bmatrix} x_1(t_2) - x_1(t_1) & y_1(t_2) - y_1(t_1) \\ x_2(t_2) - x_2(t_1) & y_2(t_2) - y_2(t_1) \\ \vdots & \vdots \\ x_k(t_2) - x_k(t_1) & y_k(t_2) - y_k(t_1) \\ -[y_1(t_2) - y_1(t_1)] & x_1(t_2) - x_1(t_1) \\ -[y_2(t_2) - y_2(t_1)] & x_2(t_2) - x_2(t_1) \\ \vdots & \vdots \\ -[y_k(t_2) - y_k(t_1)] & x_k(t_2) - x_k(t_1) \end{bmatrix}$$

$$C_m = \begin{bmatrix} r_1 \sin A_1 \\ r_2 \sin A_2 \\ \vdots \\ r_k \sin A_k \\ -r_1 \cos A_1 \\ -r_2 \cos A_2 \\ \vdots \\ -r_k \cos A_k \end{bmatrix}$$

Least squares methods can be used to solve Equation (13) for $t_z$ as:

$$t_z = [C_a^T C_a]^{-1} C_a^T C_m$$

which yields $$t_z = \begin{bmatrix} a \\ b \end{bmatrix}$$

As $a=\cos\psi$ and $b=\sin\psi$, in step 308, the position processing module 105 determines the angle $\psi$ by which the virtual constellation must be rotated as $$\psi = \begin{cases} \tan^{-1}\left[\dfrac{-b}{a}\right] & a > 0 \\ \dfrac{\pi}{2} & a = 0, b < 0 \\ \dfrac{-\pi}{2} & a = 0, b > 0 \\ \tan^{-1}\left[\dfrac{-b}{a}\right] + \pi & a < 0, b \leq 0 \\ \tan^{-1}\left[\dfrac{-b}{a}\right] - \pi & a < 0, b > 0 \\ \text{undefined} & a = 0, b = 0 \end{cases}$$

FIGS. 10A–10D illustrate changes to the mirror image virtual constellations of the group of mobiles of FIG. 2, which have been determined and horizontally oriented in accordance with the present invention based on movement measurements made during a yaw adjustment opportunity and which lead to resolution of the ambiguity in the virtual constellations in accordance with the present invention. Assume, for example, that the left-hand image in FIG. 10A is the correct one, but the position processing module has not performed the steps of the process 300 to determine which image of FIG. 10A is correct. A yaw adjustment opportunity occurs, for example, when the mobile A moves a distance at a bearing of 90 degrees as measured by the electronic compass contained in the mobile A. This movement of the mobile A results in new range measurements for links AC and AB, producing the two movement AC and AB vectors and the two constellation images as shown in FIG. 10B. The two constellation images in FIG. 10 B, however, still exhibit mirror-image symmetry. FIG. 10C shows the two constellation images rotated so that each movement vector points to the right to signify the yaw adjusted versions of these constellation images. A second yaw adjustment opportunity occurs when the mobile B moves some distance at a bearing of zero degrees as measured by its electronic compass. This movement results in new range measurements for links BC and BA, producing the movement vectors and the two constellation images as shown in FIG. 10D. The movement vector in the left-hand image in FIG. 10D points North and is consistent with the bearing measured by the compass of the mobile B. The movement vector in the right-hand image points South and conflicts with the measured bearing, thus allowing the right-hand image to be rejected as incorrect.

In accordance with a preferred embodiment of the present invention, a movement vector can only be determined for mobiles engaged in regular or quasi-regular movement. In a preferred embodiment, the position processing module accounts for the circumstance where the pattern of movements exhibited by the group of mobiles is such that yaw adjustment opportunities occur very infrequently. If too much time passes without a yaw adjustment, the position processing module declares the orientation of the virtual constellation stale and, therefore, unsuitable for deriving absolute bearing information for display to individual members of the group. Although the relative positions of nearby individuals still can be displayed under these conditions, the relative positions information in these displays is not tied to absolute directions and, instead, is referenced to the apparent direction of the movement vector for the individual wearing the display. Thus, if a mobile is not moving, or is engaged in movement that the movement assessment module deems to be irregular, the most recent satisfactory movement vector is retained as the reference until such time that it becomes possible to compute a new movement vector.

In a preferred embodiment, the position display module 106 expresses the relative positions of the mobiles of the networked group in the form of a compass bearing and relative distances from each mobile to all other mobiles within the networked group. In a further preferred embodiment, the position display module 106, based on the computed relative positions, determines absolute positions of the mobiles relative to Universal Transverse Mercator coordinates or latitude and longitude.

In a further preferred embodiment, the mobile of the present invention includes long-haul radio communication capabilities at the data transceiver module, as known in the art, and communicates the computed relative position information to another communications device, such as a remotely located communications base unit.

In a further preferred embodiment, the mobile 101 is a benchmark unit including full GPS capability. The benchmark mobile is preferably deployed in locations, such as vacant lots or rooftops, that have good visibility of a GPS constellation. The benchmark mobile uses its GPS capability, as well known in the art, to determine its position with respect to both latitude and longitude and with respect to the other team members based on the relative position information provided by any of the mobiles of the group. Based on this information, the benchmark mobile computes the absolute position of each team member relative to the benchmark.

In a preferred embodiment where a group of networked mobiles contains fewer than four mobiles, the group must include a benchmark mobile such that the total of mobiles plus benchmark mobiles is at least four to provide that the relative positions can be computed in accordance with the present invention.

In a preferred embodiment where one of the mobiles in a group of networked mobiles of the preset invention is a benchmark mobile which is intentionally placed in a fixed position, the benchmark mobile provides an additional reference point that aids the other mobiles to determine their relative positions as they maneuver. If the GPS capabilities of the benchmark mobile are not available for use, the benchmark mobile provides a stationary node in the constellation to aid in the smooth evolution of the virtual constellation as the true deployment undergoes rapid changes. In another preferred embodiment, a benchmark mobile is placed at a nexus of propagation paths of the group of mobiles and relays data and ranging signals between mobiles that otherwise are unable to communicate with or range each other. For example, a benchmark mobile would be placed at a turn in a tunnel complex being searched by a squad of soldiers.

In a further preferred embodiment, the benchmark mobile contains long-haul radio communication capabilities for transmitting the computed relative locations of the mobiles of the group to a remote command post.

Although preferred embodiments of the present invention have been described and illustrated, it will be apparent to those skilled in the art that various modifications may be made without departing from the principles of the invention.

What is claimed is:

1. A method for determining relative positions in three dimensions of at least four mobile communications devices of a wirelessly networked group, the method comprising:
   providing each of the mobiles of the group with a transceiver for wirelessly communicating with the transceivers of the other respective mobiles of the group;
   measuring ranges between each of the mobiles of the group and each of the other mobiles of the group respectively, wherein the measuring is based on propagation time data obtained from wireless communications between the respective mobiles of the group; and
   constructing, based on the ranges, first and second virtual constellations representative of estimated actual locations of each of the mobiles of the group, wherein the first constellation is a mirror image of the second constellation.

2. The method of claim 1 further comprising:
   measuring, at each of the mobiles of the group, altitude of the mobile with respect to a common altitude calibration point; and
   horizontally orienting the first and second constellations based on the altitudes.

3. The method of claim 2 further comprising:
   measuring distance and direction of movement at each of the mobiles of the group; and
   orienting the horizontally oriented first and second constellations with respect to azimuth based on the distance and direction of movement of the respective mobiles of the group.

4. The method of claim 3 further comprising:
   following the horizontal and azimuth orienting of the first and second constellations, selecting one of the first and second constellations as a true image of the relative positions of the mobiles of the group based on consistency of the directions of the measured movements of the mobiles of the group.

5. The method of claim 1 further comprising:
   wirelessly communicating the range measured between a first of the mobiles and a second of the mobiles to the first mobile or the second mobile.

6. The method of claim 2 further comprising:
   at predetermined intervals, wirelessly communicating with a time stamp the altitude measurement at each of the mobiles to each of the other mobiles of the group.

7. The method of claim 3 further comprising:
   at predetermined intervals, categorizing the measured distance and direction of movement for each of the mobiles as not moving, regular forward walking or running and motion other than forward walking or running and wirelessly communicating with a time stamp the movement categorizations from each of the mobiles in the group to each of the other mobiles in the group.

8. The method of claim 7 further comprising:
   at predetermined intervals, for each of the mobiles having the movement categorized as forward walking or running, wirelessly communicating with a time stamp the measured direction and distance of the movement to the other mobiles in the group.

9. The method of claim 1, wherein the measuring of the ranges further comprises transmitting at least one of ultra-wideband signals, acoustical ranging signals and optical ranging signals.

10. The method of claim 1, wherein the measuring of the ranges further comprises correlating pseudorandom sequences modulated on a radio frequency carrier signal.

11. The method of claim 3, wherein the transceivers of the respective mobiles transmit on a wireless communication signal measured movement, ranges and altitude for the mobiles to each of the other mobiles of the group.

12. The method of claim 3, wherein the measuring of the movement further comprises generating time stamped data representative of detected motion and compass bearing.

13. The method of claim 2, wherein the horizontal orienting of the virtual constellations further comprises optimizing fit between measured altitudes of the respective mobiles and altitudes corresponding to the horizontally oriented virtual constellations.

14. The method of claim 13, wherein the optimizing the fit includes performing at least one of a linear least square estimation, a non-linear least square estimation, a minimum mean squared error estimation, a method of moments estimation, a maximum likelihood estimation and a minimum variance estimation.

15. The method of claim 7 further comprising:
orienting the virtual constellations with respect to North for optimizing fit between measured intervals of regular walking or running motion at at least one of the mobiles and corresponding virtual movements attributable to the one mobile based on changes in the estimated three-dimensional geometric shape of the virtual constellation.

16. The method of claim 7 further comprising:
estimating an angular rotation for orienting the virtual constellations by performing at least one of a linear least squares estimation, a non-linear least squares estimation, a minimum mean squared error estimation, a method of moments estimation, a maximum likelihood estimation and a minimum variance estimation.

17. The method of claim 3 further comprising:
periodically repeating the measuring of the range, movement and altitude at each of the mobiles and then repeating the constructing of the first and second constellations, followed by the horizontal orienting of the first and second constellations, then followed by the orienting of the horizontally oriented first and second constellations as to azimuth and then the selecting of the true image from the horizontally and azimuthly oriented first and second constellations.

18. The method of claim 3 further comprising:
transmitting the relative positions of the mobiles of the group to a location remote from the location of the mobiles of the group.

19. The method of claim 1, wherein one of the mobiles in the group is in a fixed location.

20. The method of claim 19, wherein the one mobile has global positioning system capability.

21. The method of claim 19, wherein the fixed location is substantially at a nexus of communication propagation paths of the other mobiles in the group.

22. A mobile communications device for determining relative positions of a group of at least four wirelessly networked mobile communications devices comprising:
a ranging transceiver module and a data transceiver module for wirelessly communicating with a ranging transceiver module and a data transceiver module contained in each of the other respective mobiles of the group, wherein the ranging transceiver module measures ranges to each of the other mobiles of the group, wherein the measuring is based on propagation time data obtained from wireless communications with each of the other respective mobiles of the group; and
a position processing module for constructing, based on the measured ranges and mobile-to-mobile ranges generated at each of the other mobiles of the group and received at the data transceiver module, first and second virtual constellations representative of estimated actual locations of each of the mobiles of the group, wherein the first constellation is a mirror image of the second constellation.

23. The device of claim 22 further comprising:
a movement assessment module for measuring altitude of the mobile with respect to a common altitude calibration point, and wherein the position processing module horizontally orients the first and second constellations based on the measured altitude and altitudes measured at each of the other mobiles of the group and received at the data transceiver module.

24. The device of claim 23, wherein the movement assessment module measures distance and direction of movement, and wherein the position processing module orients the horizontally oriented first and second constellations with respect to azimuth based on (i) the measured distance and direction of movement and (ii) distance and direction movement measured at each of the other mobiles of the group and received at the data transceiver module.

25. The device of claim 24, wherein the position processing module, following the horizontal and azimuth orienting of the first and second constellations, selects one of the first and second constellations as a true image of the relative positions of the mobiles of the group based on consistency of the directions of the measured movements of the mobiles of the group.

26. The device of claim 22, wherein the data transceiver module wirelessly communicates the measured range with respect to a first of the mobiles of the group to at least one of the other mobiles in the group.

27. The device of claim 23, wherein the data transceiver module, at predetermined intervals, wirelessly communicates with a time stamp the altitude measurement to each of the other mobiles of the group.

28. The device of claim 24, wherein the movement assessment module, at predetermined intervals, categorizes the measured distance and direction of movement as not moving, regular forward walking or running and motion other than forward walking or running and wherein the data transceiver module wirelessly communicates with a time stamp the movement categorizations to each of the other mobiles in the group.

29. The device of claim 28, wherein the data transceiver module, at predetermined intervals, wirelessly communicates with a time stamp the measured direction and distance of the movement categorized as forward walking or running to each of the other mobiles in the group.

30. The device of claim 22, wherein the ranging transceiver module transmits at least one of ultrawideband signals acoustical ranging signals and optical ranging signals for measuring the range.

31. The device of claim 22, wherein the ranging transceiver module transmits pseudorandom sequences modulated on a radio frequency carrier signal for measuring the range.

32. The device of claim 24, wherein the data transceiver module transmits on a wireless communication signal measured movement, ranges and altitude for the mobiles to each of the other mobiles of the group.

33. The device of claim 24, wherein the movement assessment module generates time stamped data representative of detected motion and compass bearing.

34. The device of claim 23, wherein the position processing module as part of horizontal orientation of the virtual constellations optimizes fit between measured altitudes of the respective mobiles and altitudes corresponding to the horizontally oriented virtual constellations.

35. The device of claim 34, wherein the optimizing the fit includes performing at least one of a linear least square estimation, a non-linear least square estimation, a minimum mean squared error estimation, a method of moments estimation, a maximum likelihood estimation and a minimum variance estimation.

36. The device of claim 28, wherein the position processing module orients the virtual constellations with respect to North for optimizing fit between measured intervals of regular walking or running motion at at least of one of the mobiles and corresponding virtual movements attributable to the one mobile based on changes in the estimated three-dimensional geometric shape of the virtual constellation.

37. The device of claim 28, wherein the orienting of the virtual constellations is achieved by performing at least one of a linear least square estimation, a non-linear least square estimation, a minimum mean squared error estimation, a method of moments estimation, a maximum likelihood estimation and a minimum variance estimation.

* * * * *

UNITED STATES PATENT AND TRADEMARK OFFICE
CERTIFICATE OF CORRECTION

PATENT NO. : 7,031,725 B2  
APPLICATION NO. : 10/641588  
DATED : April 18, 2006  
INVENTOR(S) : Rorabaugh It is certified that error appears in the above-identified patent and that said Letters Patent is hereby corrected as shown below:

Column 9, Lines 1-2, "and node $N_Q$ are located respectively at coordinate positions ($x_p$, $y_p$, $z_p$) and ($x_Q$, $y_Q$, $z_Q$). The estimated range between $N_A$ and $N_B$ can be calculated as" should be in normal font size Column 12, Line 65, "forms the a matrix" should read -- forms the α matrix --

Column 13, Line 7, "a matrix" should read -- α matrix --

Column 13, Lines 16-18,  
"$(y_k)_{new} = (x_k)_{old} + \partial x_k K = 2,3,...,N-1$" should read -- $(y_k)_{new} = (y_k)_{old} + \partial x_k K = 2,3,...,N-1$ --  
$(z_k)_{new} = (x_k)_{old} + \partial x_k K = 3,4,...,N-1$      $(y_k)_{new} = (z_k)_{old} + \partial x_k K = 3,4,...,N-1$ Column 13, Line 44, "or the process" should read -- of the process --

Column 14, Line 65, "sin $\theta$cos" should read -- sin $\theta$ cos --

Column 14, Line 67, "$\theta$for" should read -- $\theta$ for --

Column 17, Line 38, "($X_k(t_1),y_k(t_1)$)" should read -- ($x_k(t_1),y_k(t_1)$) --

Column 17, Line 39, "($X_k(t_2),y_k(t_2)$)" should read -- ($x_k(t_2),y_k(t_2)$) --

Column 19, Line 55, "$t_z=[C_{aT}C_a]^{-1}C_a{}^T C_m$" should read -- $t_z = \left[ C_a^T C_a \right]^{-1} C_a^T C_m$ --

Signed and Sealed this

Sixth Day of November, 2007

JON W. DUDAS  
*Director of the United States Patent and Trademark Office*